2,955,136

INVERSION OF MALEIC ACID TO FUMARIC ACID

James D. Sullivan and Warn D. Robinson, Webster Groves, and Howard D. Cummings, Kirkwood, Mo., assignors to Monsanto Chemical Company, St. Louis, Mo., a corporation of Delaware No Drawing. Filed May 19, 1958, Ser. No. 735,936

16 Claims. (Cl. 260—537)

This invention relates to improvements in the catalytic inversion of maleic acid to fumaric acid and more specifically pertains to improvements in the methods of producing fumaric acid from liquors containing maleic acid.

Although fumaric acid can be produced by heating solid maleic acid to 200° C. or above in a closed system, it is frequently desirable to subject an aqueous solution of maleic acid to a catalytic inversion process. The present invention embodies the discovery that the quality of fumaric acid obtained from such processes using inversion catalysts may be substantially improved when nitric acid is present in the reaction mixture during the catalytic inversion particularly where hydrochloric acid is employed as the inversion catalyst. Moreover, by following the practices of this invention, it is possible to obtain high quality fumaric acid from crude maleic acid solutions or liquors.

It is well known in the art that the inversion of maleic acid to fumaric acid is accelerated by various inorganic catalysts such as iodine, bromine, hydrochloric acid, hydrobromic acid, sulfuric acid, potassium thiocyanate and sodium bromide. Hydrochloric acid is a very efficient inversion catalyst and is soluble in the crude aqueous solutions of maleic acid. Such a process for the preparation of fumaric acid involves heating an aqueous solution of maleic acid containing hydrochloric acid or other inversion catalyst such as an inorganic catalyst given above. As the inversion process progresses and fumaric acid is formed, the fumaric acid crystallizes out of the reaction mixture because of its low solubility in the reaction mixture and the fumaric acid crystals are subsequently recovered by filtration or by centrifuging.

When pure maleic anhydride is added to water to form an aqueous solution of maleic acid, such a solution can be heated in the presence of e.g. hydrochloric acid as an inversion catalyst to produce fumaric acid. Such an inversion process generally produces a very white fumaric acid.

However, when an attempt is made to produce fumaric acid directly from crude maleic acid solutions by such a process, the recovered fumaric acid is generally of exceedingly poor quality and has a color varying from yellow to dirty gray and to tan rather than being substantially white as required for use in the preparation of such resinous material as the polyesters which are the products of the condensation of fumaric acid with a polyhydroxy compound such as the glycols. More precisely, the fumaric acid should be sufficiently free from color bodies so that a 5% by weight solution thereof will have a color or color intensity not exceeding about an A.P.H.A. No. 10 on the Hazen scale.

To obtain a high quality fumaric acid by the isomerization of solutions of crude maleic acid, various alternatives are available such as to first subject the crude maleic acid solutions to elaborate purification methods to obtain a high quality solid maleic acid and re-dissolving said purified maleic acid before inversion, or to perform expensive and time consuming purification operations on the off quality fumaric acid in order to obtain a product of satisfactory or stable quality or to dehydrate these crude maleic acid solutions to form maleic anhydride, purify the maleic anhydride and then reform a maleic acid solution from the purified anhydride. Any of these three alternatives add excessively to the ultimate cost of the final fumaric acid product. The improvement in the catalytic inversion of maleic acid achieved by following the practices of this invention makes it possible to obtain a high quality fumaric acid of a substantially snowy white color, from crude maleic acid solutions without having to extensively purify the crude maleic acid solution or the final fumaric acid product. It has now been discovered that a substantially improved fumaric acid product can be produced by the direct isomerization or inversion of maleic acid contained in a relatively impure maleic acid solution employing HCl as the inversion catalyst. The fumaric acid produced according to this invention is so nearly pure white that a 5% solution thereof in ethanol has a color on the Hazen scale corresponding to A.P.H.A. No. of from 4 to 6.

According to this invention, the maleic acid contained in a crude maleic acid solution is directly isomerized to fumaric acid in the presence of nitric acid in addition to the hydrogen chloride isomerization catalyst and which is present in the aqueous reaction mixture as hydrochloric acid. The hydrochloric acid can be added to the maleic acid solution at any time either prior to or with the addition of the nitric acid during the isomerization step, but generally no advantage is to be gained by adding it before the maleic acid solution is at a temperature of at least 50° C.

As is known to those skilled in the art, maleic acid is generally derived from maleic anhydride which in turn may be made in various ways but usually by the catalytic oxidation of benzene or other suitable hydrocarbons. There may be used in the process of this invention crude maleic acid solutions derived from various sources, e.g., solutions obtained by dissolving crude maleic anhydride in water, liquors obtained during the recovery and/or purification of maleic anhydride, etc.

The maleic acid solutions used in the process of this invention may vary substantially in concentration but preferably contain 50 to 80% by weight maleic acid. Even more preferred are solutions containing 55 to 75% by weight maleic acid.

In some cases where the crude maleic acid solutions are unusually impure, the fumaric acid made from such solutions by the practices of this invention may have a yellow color even though nitric acid was present during the inversion. In such cases it has been found that the quality of the fumaric acid produced from these unusually impure maleic acid solutions can be still further improved by also concentrating the maleic acid solution in the presence of nitric acid as well as having nitric acid present during the inversion step, for nitric acid when added during the concentration step in amounts up to 10 parts by weight per 100 parts of maleic acid will not cause a perceptible amount of maleic acid to be converted to fumaric acid during the concentrating process. Also when very dark colored maleic acid solutions are used in the process of this inversion, it will be found desirable to first heat these solutions with activated carbon and then filter the solutions so treated before charging them to the concentration step. Said activated carbon being present in an amount of from 1 to about 7% by weight based on the weight of maleic acid, and preferably 4% to 7%.

Usually, amounts of $HNO_3$ within the range of from 0.2 to 2 parts by weight will suffice in the concentration step.

The concentration can be carried out at sub- or superatmospheric pressures; however, where long time cycles are necessary, sub-atmospheric concentration is preferred. In fact, a vacuum of about 200 mm. Hg is especially preferred.

In the preferred practice of this invention, the maleic acid solution is cooled to about 65° C., hydrochloric acid is added to the cooled concentrate, the resulting aqueous solution is heated to reflux and maintained under reflux conditions, all while slowly and continuously adding nitric acid to the concentrate. The reaction is continued under gentle reflux until essentially all the fumaric acid has been precipitated during which time nitric acid is slowly and continuously added to the isomerization medium. The flow of nitric acid into the isomerization medium is controlled so that the total quantity of nitric acid added during the inversion of maleic acid amounts to about 0.5 to 5 parts by weight of $HNO_3$ per 100 parts of maleic acid originally present. After the reflux period is completed, the flow of nitric acid is stopped and the isomerization medium cooled to room temperature. The fumaric acid crystals are then recovered preferably by filtration or centrifuging, washed with cold water and dried. By this preferred process, fumaric acid having a substantially snowy white color is obtained in yield of 90% or more based on the maleic acid in the original liquors. The process of this invention can also be carried out by adding the hydrochloric acid to the maleic acid solution at a temperature below 65° C., say 30° to 50° C., or above 65° C.

Aside from the preferred proportions of $HNO_3$ to be used during the inversion step, i.e. from 0.5 to 5 parts by weight per 100 parts of maleic acid present, this invention can be practiced by employing from about 0.1 part up to 10 or more parts by weight of $HNO_3$ per 100 parts by weight of maleic acid. Although higher amounts, e.g. 50 or more parts of $HNO_3$, can be employed and the pure product still obtained, a significant decrease in yield is experienced which makes it uneconomical to do so. Of course, the amount of $HNO_3$ to be used will vary according to the degree of purity of the maleic acid used.

For optimum results with respect to rate of reaction, quality and yields of fumaric acid, it is preferred to adjust the concentration of the maleic acid solution so that after the addition of hydrochloric acid the isomerization medium contains for each 100 parts by weight of maleic acid 5 to 20 parts by weight of HCl and from 33 to about 80 parts by weight of water. Depending upon convenience, the hydrogen chloride may be added to the reaction mixture in the form of hydrogen chloride gas or in the form of hydrochloric acid. However, when hydrochloric acid is added to the reaction mixture, the water present must be taken into account so that the reaction mixture after addition of the hydrochloric acid will contain maleic acid and water within the preferred ranges hereinbefore set forth.

Due to the fact that fumaric acid has a very low solubility in the acidic aqueous inversion medium the fumaric acid separates from the inversion medium in the form of fine crystals substantially as quickly as the fumaric acid is formed. Hence, the reaction mixture ultimately becomes a heavy slurry of fine crystalline fumaric acid. The proportions of maleic acid, HCl and water as above indicated provide a maximum conversion of the maleic acid to fumaric acid and a readily processible slurry from which yields up to 95% or better of high quality fumaric acid can be obtained.

Aside from the preferred proportions of maleic acid, HCl and water hereinbefore set forth, this invention can be practiced by employing isomerization mediums containing for each 100 parts by weight of maleic acid from 2 parts by weight of hydrogen chloride up to the saturation of HCl under the particular condition selected.

In the practice of this invention, it is preferred to add the nitric acid to the maleic acid solution containing hydrochloric acid during the inversion reaction while the temperature of the inversion medium is maintained at about reflux temperature which, of course, will vary with the concentration of the dissolved materials in the medium. In general, the reflux temperature will be between about 105° C. and about 120° C. at atmospheric pressure. However, if desired, the temperature of the isomerization medium may be varied between 50° C. and 150° C. during the isomerization reaction and while the nitric acid is being added to the reaction medium. When the process of this invention is carried out at pressures above atmospheric pressure, higher reaction temperatures may be employed, i.e. 125° to 200° C.

The following examples are employed to illustrate the practice of this invention as well as the improved results obtainable by the practices of this invention. It is not intended that the scope of this invention be limited solely to the precise conditions and proportions hereinafter set forth, for it is to be understood that the proportions herein given may be varied as desired and as dictated by the size of reaction equipment. Furthermore, the reaction conditions may be varied as hereinbefore set forth.

The first five examples which follow illustrate the isomerization of maleic acid to fumaric acid by prior art processes employing aqueous maleic acid solutions but which do not employ nitric acid during isomerization.

*Example I*

1300 parts of a crude aqueous solution containing about 339 parts of maleic acid (26% by weight) are concentrated by distillation at atmospheric pressure until the maleic acid content is about 69% by weight, boiling point 113° C. While maintaining the concentrate at its reflux temperature 145 parts of 22° Bé. hydrochloric acid (35% by weight HCl) were added. The resulting aqueous solution contained about 58% by weight maleic acid and 51 parts of HCl. This resulting concentrate was maintained under reflux conditions for about 2 hours during which time fumaric acid crystals separated from the reaction mixture. At the end of the reflux period, the reaction mixture was cooled to room temperature, about 27° C. and the fumaric acid crystals were separated therefrom by filtration, washed and dried. The fumaric acid thus obtained was a brownish tan in color and was otherwise of poor quality.

*Example II*

The process described in Example I was repeated except that the first concentrate was cooled to about 80° C. and treated with 7 parts of activated charcoal for about 15 minutes at 80° C. The resulting aqueous mixture was filtered and the filtrate heated to reflux with the hydrochloric acid. The fumaric acid recovered from this process was only slightly improved in color over the product of Example I and was also a low grade of fumaric acid.

*Example III*

The process described in Example I was repeated except that 705 parts of a black crude aqueous solution containing about 41% by weight maleic acid was concentrated to a maleic acid content of about 69% by weight and then treated as described in Example I. The fumaric acid obtained from this process was dark brown.

*Example IV*

The process described in Example II was repeated except that 705 parts of a crude liquor such as described in Example III were employed. Again the fumaric acid recovered was very dark in color.

*Example V*

1421 parts by weight of crude maleic acid solution containing 24.7% maleic acid by weight, obtained by scrubbing gases resulting from the partial oxidation of benzene where heated together with 12.3 parts of nitric acid containing 69.5% $HNO_3$ until the resulting aqueous mixture boils. This mixture was heated at its boiling point and water removed therefrom until it has a specific gravity of 1.160 at 25° C. corresponding to a maleic acid content of 45.8% by weight. Thereafter, the aqueous mixture was cooled and mixed with about 5% by weight of charcoal based on the weight of maleic acid contained in the solution. The resulting mixture was filtered after the aqueous solution had been in contact with the charcoal for about an hour and the filtrate was concentrated under reduced pressure (150 mm. Hg) until the solution contained about 75% of maleic acid. The resulting solution was cooled to crystallize the maleic acid which was recovered by filtration and dried. The recovered maleic acid was dark brown in color.

209 parts of the solid maleic acid recovered in this manner were dissolved in 103 parts of hot water to form a solution containing 67% by weight of maleic acid. To this solution there was added 73.8 parts by weight of hydrochloric acid (35% HCl) and the resulting mixture heated to its boiling point during which time fumaric acid precipitated. The resulting fumaric acid slurry was filtered and the fumaric acid washed with water and dried. An ethanol solution containing 5% by weight of the fumaric acid obtained in this manner had a color corresponding to an A.P.H.A. No. of about 100 on the Hazen scale.

The following examples will illustrate the process of this invention.

Example VI 212 parts of the maleic acid recovered in the concentration step of Example V were dissolved in 104 parts of water to form a solution containing 67% by weight of maleic acid. To this solution there was added 75 parts by weight of hydrochloric acid (35%) HCl and the resulting mixture heated to its boiling point while slowly adding thereto 3 parts by weight of 43° Bé. nitric acid during which time the fumaric acid precipitated. The resulting fumaric acid was filtered and the fumaric acid washed with water and dried. An ethanol solution containing 5% by weight of the fumaric acid obtained in this manner had a color corresponding to an A.P.H.A. No. of 5 on the Hazen scale.

Example VII 397 parts of crude aqueous solution containing 28% by weight maleic acid is concentrated to a maleic acid content of 69% by weight, boiling point 113° C., in the presence of 0.4 part of 43.5° Bé. nitric acid. No fumaric acid precipitated during this concentration step. After the resulting concentrate is cooled to about 65°, there is added 44.1 parts of 20° Bé. hydrochloric acid. The diluted concentrate containing 58% by weight maleic acid is heated slowly to reflux temperature while adding 43.5° Bé. nitric acid slowly and continuously. The reaction medium is refluxed for about 2 hours during which time 1.2 parts of the nitric acid is added. The resulting fumaric acid slurry is filtered and the fumaric acid crystals are washed with water and dried. The fumaric acid produced by this process is snowy white in color and is recovered in a 95% yield based on the maleic acid charged. An ethanol solution containing 5% by weight of this fumaric acid had a color corresponding to A.P.H.A. No. 5 on the Hazen scale.

Example VIII

The process of Example VII is repeated except that 39.5 parts of 22° Bé. hydrochloric acid is employed in place of the 20° Bé. hydrochloric acid and the hydrochloric acid is added slowly while the concentrate is at reflux temperature. An ethanol solution containing 5% by weight of this fumaric acid had a color corresponding to A.P.H.A. 5 on the Hazen scale.

Example IX

The process of Example VII is repeated except that HCl is bubbled into the concentrated aqueous solution containing nitric acid while the isomerization medium is maintained at reflux conditions in place of adding hydrochloric acid. This process results in a snowy white fumaric acid product in yields of 90% and above.

Example X 763 parts of crude solution such as described in Example III containing 48% by weight maleic acid are heated with 7 parts of activated carbon at 80° C. for one-half hour. The resulting aqueous mixture is filtered and the filtrate charged to distillation equipment together with 33 parts of 70% by weight nitric acid (6.3 parts of $HNO_3$ per 100 parts of maleic). The maleic acid solution is concentrated to a maleic acid content of 63% by weight boiling point 110° C. Again no fumaric acid precipitated during this concentration step. To the resulting concentrate maintained at reflux temperature, there is added 127 parts of hydrochloric acid containing 36% by weight HCl and thereafter there is added slowly and continuously a nitric acid solution containing 70% by weight $HNO_3$ over a 2 hour period. The total amount of nitric acid added during the isomerization step is 3.0% based on the amount of maleic acid originally charged. At the end of the reflux period, the resulting fumaric acid slurry is cooled to room temperature. The fumaric acid crystals are recovered by filtration, washed and dried. By this process, there is recovered in a yield of about 90%, based on the maleic acid charged, fumaric acid having a substantially pure white color. A 5% by weight solution thereof in ethanol had a color corresponding to A.P.H.A. No. 6 on the Hazen scale.

Example XI

The process of Example X is repeated except that the crude solution is first heated to 80° C. and recycled through a column ⅜" in diameter and 6" long packed with activated carbon for about 60 minutes. The resulting clear brown aqueous solution is then concentrated and refluxed under the conditions described in Example VIII. This process produces a snowy white fumaric acid in a yield of about 92% based on the maleic acid charged.

Example XII

The process described in Example X is repeated except that the crude solution is heated with activated carbon (about 4% based on the maleic acid), filtered and then charged to the process. This process produces a snowy white fumaric acid in a yield in excess of about 90% based on the maleic acid charged.

Example XIII

The process described in Example X is repeated except that a clear, light brown crude liquor containing about 50% by weight maleic acid is employed and the treatment with activated carbon is omitted. The fumaric acid obtained from this process represents a conversion of about 95% by weight of the maleic acid originally charged and is snowy white in color.

Example XIV

The process described in Example XVIII is repeated except that the process was carried out under 30 pounds per square inch and at 140° C. The fumaric acid obtained from this process represents a conversion of about 95% by weight of maleic acid originally charged and is snowy white in color.

Example XV

The process of Example VII is repeated except that the isomerization is maintained at a temperature of 90° C. for 2½ hours. The fumaric acid produced is snowy white in color and a 5% ethanol solution thereof had a color corresponding to A.P.H.A. 5 on the Hazen scale.

*Example XVI*

169.0 parts of hydrochloric acid (35% by weight HCl) were added to an aqueous solution containing 474 parts of purified maleic acid and 187 parts of water. The resulting solution was heated to reflux and maintained at reflux temperature for a period of one hour. The resulting fumaric acid slurry filtered and the fumaric acid crystals were washed with water and dried. A yield of 94.5% based on the maleic acid charged, was obtained.

In contrast to this, when the above experiment is repeated except that a total of 67.7 parts of 70% nitric acid are gradually added to the concentrated maleic acid solution over the heating up and refluxing periods, the fumaric acid is produced in only 88% yield.

Similar experiments indicate that amounts of $HNO_3$ below about 5 parts by weight of $HNO_3$ per 100 parts of maleic acid have very little effect on the inversion yield, and yet a snowy white fumaric acid is still obtained from the crude maleic acid solution used. Whereas amounts of $HNO_3$ above about 5 parts by weight per 100 parts of maleic acid have an adverse effect on the inversion yield.

This application is a continuation-in-part application of United States Serial Number 407,596, filed February 1, 1954, now abandoned.

While this invention has been described with respect to certain embodiments, it is not so limited, and it is to be understood that variations and modifications thereof obvious to those skilled in the art may be made without departing from the spirit of this invention.

What is claimed is:

1. In a process for the inversion of maleic acid to fumaric acid of improved color the step comprising isomerizing maleic acid in a crude aqueous solution in the presence of from about 0.1 to about 10 parts by weight of nitric acid per 100 parts by weight of maleic acid, in addition to hydrochloric acid as the isomerization catalyst.

2. In a process for the inversion of maleic acid to fumaric acid of improved color, the step comprising adding from about 0.1 to about 10 parts by weight of nitric acid per 100 parts by weight of maleic acid to a crude aqueous solution of maleic acid containing hydrochloric acid as the isomerization catalyst.

3. In a process for the inversion of maleic acid to fumaric acid of improved color, the step comprising heating a crude aqueous solution of maleic acid containing hydrochloric acid as the isomerization catalyst while continuously adding thereto from 0.1 to about 10% by weight of nitric acid, based on the weight of maleic acid.

4. The process of claim 3 wherein the aqueous solution is heated to a temperature within the range of 50° to 150° C.

5. The process of claim 3 wherein the hydrochloric acid is added to the aqueous solution of maleic acid at about 65° C., the resulting solution is heated to reflux temperature and the aqueous solution is maintained under reflux conditions.

6. In a process for the inversion of maleic acid to fumaric acid of improved color, the steps comprising heating a crude aqueous solution of maleic acid, adding hydrochloric acid to the maleic acid solution, continuing the heating of said solution to a temperature within the range of from 50 to 150° C. while adding thereto a total of from 0.5 to about 5 parts by weight of nitric acid per 100 parts of maleic acid charged.

7. In a process for the inversion of maleic acid to fumaric acid of improved color, the steps comprising heating a crude aqueous solution of maleic acid, adding hydrochloric acid to the maleic acid solution at a temperature below about 65° C., continuing the heating of said solution to its reflux temperature while adding thereto a total of from 0.5 part to 5 parts of nitric acid per 100 parts of maleic acid charged.

8. In a process for the inversion of maleic acid to fumaric acid of improved color, the steps comprising concentrating a crude aqueous solution of maleic acid in the presence of nitric acid to a concentration of from 50 to 80% by weight maleic acid, adding from about 10 to about 15 parts by weight of HCl for each 100 parts of maleic acid in said solution, then heating said solution to temperature within the range of from 50 to 150° C. and maintaining it at reflux temperature while adding a total of 0.5 to 5 parts by weight of nitric acid per 100 parts of maleic acid in said solution.

9. In a process for producing fumaric acid of improved color by the catalytic inversion of maleic acid in a crude dilute aqueous maleic acid liquor, the steps comprising adding from 0.1 to 10 parts by weight of nitric acid per 100 parts of maleic acid present, by intermittent addition to the crude liquor while concentrating said crude liquor by distilling off water until the concentrate contains from 50% to 80% maleic acid, adding thereto from about 10 to about 15 parts by weight of HCl for each 100 parts of maleic acid, heating the resulting concentrate to about its reflux temperature while slowly and continuously adding a total of from 0.5 to 5 parts of nitric acid for each 100 parts of maleic acid, during the heating of said concentrate.

10. The process of claim 9 wherein there is added to the crude maleic acid liquor from about 1% to 7% by weight of activated carbon based on the maleic acid and the resulting mixture stirred and heated to a temperature of from 60° C. to 100° C. and filtered before concentrating the crude liquor.

11. The process of claim 10 wherein the distillation is carried out under a vacuum.

12. The process of claim 11 wherein the distillation is carried out at a vacuum of about 200 mm. of Hg pressure (absolute).

13. The process of claim 10 wherein the crude maleic acid liquor is concentrated to a composition containing 67 to 72% by weight of maleic acid and adding thereto at a temperature below about 65° C. sufficient hydrochloric acid containing from 27% to 35% by weight of HCl to provide 12.5 parts by weight of HCl per 100 parts by weight of maleic acid and a final concentrate containing 55 to 60% by weight of maleic acid.

14. In a process for producing fumaric acid of improved color by the catalytic inversion of maleic acid contained in a crude aqueous maleic acid solution, the steps comprising the intermittent addition of 0.2 to 2 parts by weight of nitric acid per 100 parts of maleic acid present while concentrating by distillation said crude solution to a composition containing more than 50% by weight of maleic acid, and adding thereto sufficient hydrochloric acid to provide from 10 to 15 parts by weight of HCl for each 100 parts by weight of maleic acid, thereby producing a composition containing from not less than 50% to about 80% maleic acid, heating the resulting aqueous composition to its reflux temperature and maintaining it under reflux conditions while slowly and continuously adding to said concentrate a total of from 0.5 to 5 parts by weight of nitric acid per 100 parts of maleic acid in said concentrate.

15. The process of claim 14 wherein the aqueous maleic acid concentrate after addition of the hydrochloric acid is 55% to 60% by weight.

16. In a process for the inversion of maleic acid to fumaric acid of improved color, the steps comprising concentrating a crude aqueous solution of maleic acid in the presence of from 0.2 to 2 parts of nitric acid per 100 parts of maleic acid to an aqueous maleic acid composition such that the maleic acid content is from 50% to 80% by weight after there is added thereto 12.5 parts by weight of HCl as hydrochloric acid for each 100 parts by weight of maleic acid, cooling said concentrate to about 65° C., adding said quantity of hydrochloric acid to said concentrated aqueous medium then heating the resulting aqueous maleic acid medium to its reflux temperature, maintaining it at its reflux temperature while slowly and continuously adding thereto a total of from 0.5 to 5 parts by weight of nitric acid per 100 parts by weight of maleic acid in said concentrate.

References Cited in the file of this patent

UNITED STATES PATENTS

| | | |
|---|---|---|
| 1,914,556 | Conover | June 20, 1933 |
| 2,208,519 | Spence | July 16, 1940 |
| 2,704,296 | Dobratz | Mar. 15, 1955 |
| 2,758,134 | Dobratz | Aug. 7, 1956 |
| 2,790,827 | Cummings et al. | Apr. 30, 1957 |

UNITED STATES PATENT OFFICE
CERTIFICATE OF CORRECTION

Patent No. 2,955,136                          October 4, 1960

James D. Sullivan et al.

It is hereby certified that error appears in the printed specification of the above numbered patent requiring correction and that the said Letters Patent should read as corrected below.

Column 5, line 1, for "where" read -- were --; column 6, line 65, for "Example XVIII" read -- Example XIII --.

Signed and sealed this 4th day of April 1961.

(SEAL)
Attest: ERNEST W. SWIDER

Attesting Officer

ARTHUR W. CROCKER
Acting Commissioner of Patents